(12) United States Patent
Strandell

(10) Patent No.: US 9,850,950 B2
(45) Date of Patent: Dec. 26, 2017

(54) BEARING COMPONENT PART, BEARING COMPONENT AND PROCESS FOR MANUFACTURING A BEARING COMPONENT

(71) Applicant: AKTIEBOLAGET SKF, Göteborg (SE)

(72) Inventor: Ingemar Strandell, Sävedalen (SE)

(73) Assignee: AKTIEBOLAGET SKF, Gothenburg (SE)

( * ) Notice: Subject to any disclaimer, the term of this patent is extended or adjusted under 35 U.S.C. 154(b) by 105 days.

(21) Appl. No.: 14/782,796

(22) PCT Filed: Apr. 7, 2014

(86) PCT No.: PCT/SE2014/000040
§ 371 (c)(1),
(2) Date: Oct. 7, 2015

(87) PCT Pub. No.: WO2014/168544
PCT Pub. Date: Oct. 16, 2014

(65) Prior Publication Data
US 2016/0312831 A1    Oct. 27, 2016

(30) Foreign Application Priority Data
Apr. 9, 2013  (SE) ...................... 1300256

(51) Int. Cl.
*F16C 33/64* (2006.01)
*F16C 33/62* (2006.01)
(Continued)

(52) U.S. Cl.
CPC .............. *F16C 33/62* (2013.01); *B22F 3/15* (2013.01); *B22F 7/08* (2013.01); *B23K 20/026* (2013.01);
(Continued)

(58) Field of Classification Search
CPC .... B22F 3/15; B22F 7/06; B22F 7/062; B22F 7/08; B23K 20/026; B23K 20/227;
(Continued)

(56) References Cited

U.S. PATENT DOCUMENTS 2,765,520 A * 10/1956 Donley .................. F16C 33/14
                                                 205/170
3,630,584 A * 12/1971 McKee ................. F16C 19/163
                                                 384/469
(Continued)

FOREIGN PATENT DOCUMENTS

| CN | 201343903 U | 5/2011 |
|----|-------------|--------|
| CN | 201836223 U | 5/2011 |
| CN | 201836225 U | 5/2011 |
| CN | 102292562 A | 12/2011 |
| DE | 10333542 B3 | 11/2004 |
| JP | 2002069563 A | 3/2002 |

(Continued)

*Primary Examiner* — Phillip A Johnson
(74) *Attorney, Agent, or Firm* — Bryan Peckjian; SKF USA Inc. Patent Dept.

(57) ABSTRACT

A bearing component part, a bearing component and a process for manufacturing the bearing component. The bearing component part comprises at least one circumferential peripheral surface, wherein the circumferential peripheral surface presents at least one groove extending along at least a part of the circumference of the peripheral surface, wherein the groove is arranged to receive a second material, the peripheral surface further presenting a first and a second portion located on opposite sides of the at least one groove along the circumference of the peripheral surface, wherein the bearing component part comprises a weldable metallic material.

11 Claims, 3 Drawing Sheets

(51) Int. Cl.
  *B22F 7/08* (2006.01)
  *F16C 33/30* (2006.01)
  *B23K 20/02* (2006.01)
  *B23K 20/227* (2006.01)
  *B22F 3/15* (2006.01)
  *B23K 103/04* (2006.01)
  *B23K 103/18* (2006.01)

(52) U.S. Cl.
  CPC ............ *B23K 20/227* (2013.01); *F16C 33/30* (2013.01); *F16C 33/64* (2013.01); *B22F 2999/00* (2013.01); *B23K 2203/04* (2013.01); *B23K 2203/05* (2015.10); *B23K 2203/18* (2013.01)

(58) Field of Classification Search
  CPC ............ B23K 2203/04; B23K 2203/05; B23K 2203/18; F16C 33/62; F16C 33/64
  See application file for complete search history.

(56) References Cited

U.S. PATENT DOCUMENTS

| | | | | |
|---|---|---|---|---|
| 3,782,794 | A | * | 1/1974 | Chmura ................ B22F 3/1109 384/492 |
| 4,699,309 | A | * | 10/1987 | Atsuta ................... B23K 20/22 228/116 |
| 5,439,297 | A | * | 8/1995 | Kitayama ............. F16C 33/585 384/469 |
| 5,971,620 | A | * | 10/1999 | Gabelli .................... F16C 33/32 384/491 |
| 2008/0212911 | A1 | | 9/2008 | Beer et al. |
| 2010/0189385 | A1 | * | 7/2010 | Muramatsu .......... C04B 35/593 384/492 |

FOREIGN PATENT DOCUMENTS

| | | | |
|---|---|---|---|
| JP | 2002266872 A | 9/2002 | |
| WO | WO 2005118204 A1 | * 12/2005 | ........... B23K 20/002 |

* cited by examiner

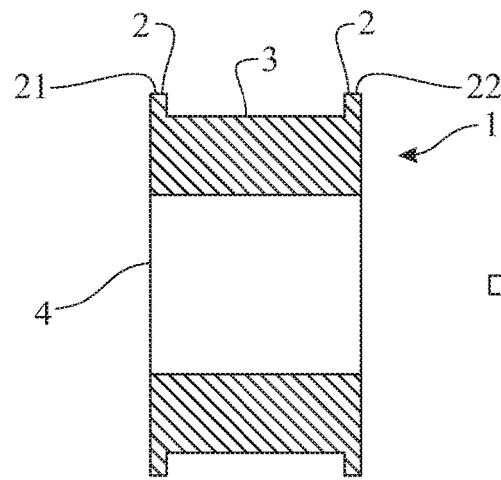
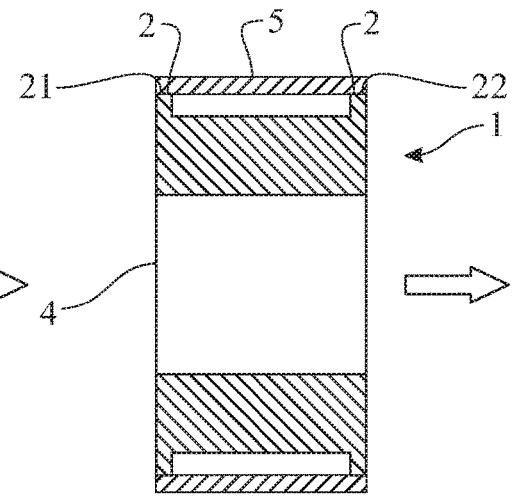
FIG. 3A  FIG. 3B
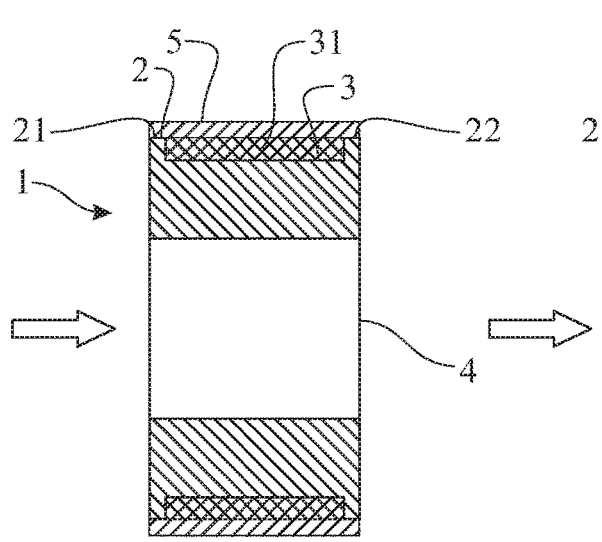
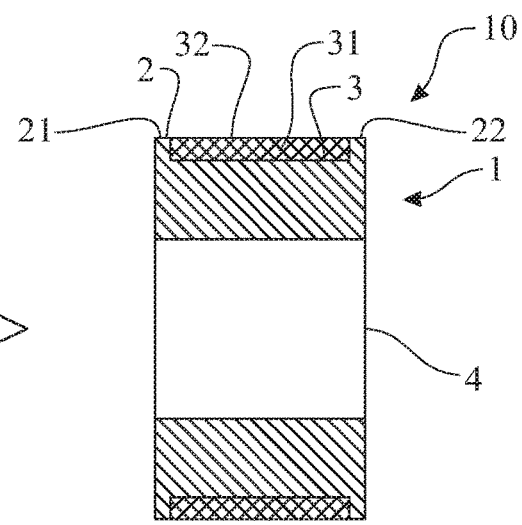
FIG. 3C  FIG. 3D

# BEARING COMPONENT PART, BEARING COMPONENT AND PROCESS FOR MANUFACTURING A BEARING COMPONENT

CROSS REFERENCE TO RELATED APPLICATION

This is a U.S. National Stage Application claiming the benefit of International Application Number PCT/SE2014/000040 filed on 7 Apr. 2014 (Jul. 4, 2014), which claims the benefit of Sweden Patent Application 1300256-3 filed on 9 Apr. 2013 (Sep. 4, 2013), both of which are incorporated herein by reference in their entireties.

FIELD OF THE INVENTION

According to a first aspect, the invention pertains to a bearing component part, such as a part of an inner ring or an outer ring of a rolling bearing.

According to a second aspect, the invention pertains to a bearing component which comprises the bearing component part according to the first aspect of the invention.

According to a third aspect, the invention pertains to a process for manufacturing a bearing component according to the second aspect of the invention.

BACKGROUND OF THE INVENTION

Rolling bearings are well known and comprise roller bearings, ball bearings and also combinations thereof. In recent years an increased differentiation of customers' needs and demands has been seen. This has resulted in an increase in customization of rolling bearings, which in turn has lead to that more variants and smaller batches of each variant is manufactured. This development has especially been seen for larger rolling bearings, such as larger spherical roller bearings, tapered roller bearings, cylindrical roller bearings etc. Also, larger rolling bearings are often manufactured in smaller series since these bearings often are manufactured on direct customer orders and are not manufactured and put on stock. The different customer demands relate to e.g. different material demands, different demands on material hardness, wear characteristics, ductility, heat resistance etc. In addition, the higher customer demands often relate to a need to customize and optimize the rolling contact surfaces between the bearing components. Therefore, there is a need to find a cost effective solution that could increase the ability to offer different customized solutions for customers with different needs and to be able to fulfill the high and increasing demands on improved rolling contact surfaces.

SUMMARY OF THE INVENTION

Therefore, an object of the invention is to provide a solution to the above identified needs.

According to the first aspect of the invention, the object has been achieved by providing a bearing component part, comprising at least one circumferential peripheral surface, wherein the circumferential peripheral surface presents at least one groove extending along at least a part of the circumference of the peripheral surface. The groove is arranged to receive a second material.

The peripheral surface further presents a first and a second portion located on opposite sides of the at least one groove along the circumference of the peripheral surface. Further, the bearing component part comprises a weldable metallic material. By providing a bearing component part with the current features it is now possible to be able to offer many different bearing components with different characteristics, which characteristics can be altered by altering the filling material in the groove. The filler material, viz. the second material, can vary to an indefinite extent to fulfill the different customer demands. The bearing component part and the filler material which is received in the groove is subsequently subjected to a diffusion welding process to thereby bond the filler material to the bearing component part, i.e. the body of the bearing component. A sheet metal strip is fixed to the bearing component part by welding for the diffusion welding process according to the third aspect of the invention. The first and second portion on the circumferential peripheral surface provides an efficient way to fixate the sheet metal strip onto the bearing component part which is essential for the diffusion welding process, and in an embodiment, the first and second portion comprises a weldable metallic material. By fixating a sheet metal strip to the bearing component part by welding a closed space will be created, i.e. the groove will be closed. This is a very efficient and cost effective way to create the closed space which is needed for the diffusion welding process. The high efficiency is advantageous to be able to produce many variants of bearing components in small series.

Exemplifying and advantageous embodiments of the bearing component part according to the first aspect of the invention will now be presented.

According to an embodiment of the bearing component part, the circumferential peripheral surface is meant to be a raceway of a bearing ring, or a rolling surface of a roller. It is the characteristics of the rolling contact surfaces in the rolling bearing which are crucial for bearing service life. Therefore, by applying a high performance steel to the raceway surface bearing operation life can be increased. The groove may be located only at the rolling contact surfaces in the rolling bearing. Thereby, it is not necessary to have high performance steel over the full width of the circumferential peripheral surface. This further increases the cost efficiency of this design.

In an embodiment of the bearing component part, the bearing component part is a part of any of an inner ring of a bearing, an outer ring of a bearing, or a roller of a roller bearing.

In an embodiment of the bearing component part, the bearing component part is made of any of weldable cast iron or cast steel which is weldable. By using a cast steel or cast iron and thus casting the bearing component part the bearing component part can be made in a cost-efficient manner. Casting is a cost efficient method, especially when only small series needs to be produced. Most bearing rings are made by cold and/or warm rolling rings which is a method that is more adapted for producing larger series. Further, known bearing rings which are rolled comprises a homogenous steel body. So, if high performance steel is needed at the rolling contact surfaces, the whole bearing ring has to comprise such steel, which lead to very expensive rings. Therefore, by using a low cost body part and then diffusion weld a high performance steel onto the body part only at the surfaces where it is needed (i.e. mainly at the rolling contact surfaces), a more cost effective high performance bearing component will be realized.

In another embodiment, the bearing component part is made of a warm or cold rolled or forged cylindrical element, such as a ring element.

According to the second aspect of the invention, the object has been achieved by providing a bearing component comprising a bearing component part according to the first aspect of the invention. The groove in the bearing component part is filled with a second material, preferably a metallic powder material, which has been subjected to a diffusion welding process so that the second material has bonded to the bearing component part. All aspects of the first aspect of the invention are applicable to all aspects of the second aspect of the invention and vice versa. The material that has been diffusion welded onto the bearing component part may be a bearing steel of any type, and in particular a high performance bearing steel. In an embodiment, the groove in which the second material has been bonded by diffusion welding may be located only at the rolling contact surfaces of the bearing component. This design provides a bearing component, such as a bearing ring, that is able to fulfill the high customer demands on the rolling contact surfaces and which also is produced in a cost-efficient manner. It is further especially advantageous for small series where the rolling bearing is customized for a specific application. For example, demands on rolling bearings for wind turbines are very high and it is very important to have a high performing material at the rolling contact surfaces to be able to cope with the high forces experienced in these applications. This bearing component provides a bearing which can fulfill these high demands. Further, the bearing component part can be made into near net shape, by e.g. casting the bearing component part into near net shape, followed by the diffusion welding process to thereby apply the second material. After the removal of the sheet metal strip, the bearing component may be in near net shape, i.e. no further major steps may be performed to reach the final shape of the bearing component. For instance, in the case when the bearing component is a ring of a rolling bearing, there is no need to perform any subsequent ring rolling steps.

In an embodiment of the bearing component, the second material is any bearing steel as described by ISO 683-17: 1999(E), pages 9-10. Examples of such steels are through hardening bearing steels, case hardening steels, induction hardening steels, stainless bearing steels or high temperature steels such as M50 steel, M50 Nil steel etc. In parallel to the by ISO defined bearing steels can also other steels be used as long as they can meet the high Hertzian contact demands on macro and micro cleanliness. To this group of steels can specially N-alloyed martensitic stainless steels suitable for martensitic hardening, such as XD15NW or similar grades but also higher alloyed stainless tool steels be used. Further, stainless steels suitable for surface enrichment and martensitic hardening may be used. In a further embodiment, the second material is a metallic powder material.

In an embodiment of the bearing component, the diffusion welding process is a hot isostatic pressing (HIP) process.

In an embodiment, the bearing component is a component of a spherical roller bearing. The bearing component may be an inner ring, an outer ring or a roller of the bearing. If the bearing component is an inner ring of a double-row spherical roller bearing, both raceways of the inner ring may comprise a groove filled with a high performance bearing steel, such as e.g. M50 steel. This would provide improved rolling contact surfaces between the inner ring and the roller elements.

In other embodiments, the bearing component is a component of any roller bearing or ball bearing, such as a cylindrical roller bearing, a tapered roller bearing, a toroidal roller bearing etc.

According to the third aspect of the invention, the object has been achieved by a process for manufacturing a bearing component, such as a bearing ring or a roller. The process comprises the following steps:
  providing a bearing component part according to the first aspect of the invention,
  fixating a sheet metal strip to the bearing component part, so that the at least one groove and the sheet metal strip creates at least one closed space,
  filling the at least one closed space with a second material, and
  diffusion welding the second material to thereby fixate and bond the second material to the bearing component part. This process realizes a bearing component according to the second aspect of the invention. It shall be noted that all embodiments of the second aspect of the invention are applicable to all embodiments of the third aspect and vice versa. This process provides an efficient method to obtain a composite bearing component. By using a sheet metal strip and fixate it onto the bearing component part to thereby create a closed space for the diffusion welding process a more efficient, simple and thereby also cost efficient process is realized. Further, by only applying the second material where it is needed, i.e. at least at the rolling contact surfaces of the bearing component, an even increased cost efficiency is realized.

In an embodiment, the sheet metal strip is fixated to the bearing component part by welding. And in a further embodiment, the sheet metal strip is fixated onto the circumferential peripheral surface via the weldable first and second portion by welding. This is an efficient method to fixate the sheet metal strip.

In an embodiment of the process, the sheet metal strip is subsequently removed from the bearing component. In another embodiment, the removal of the sheet metal strip is made by any of a subsequent grinding step, or a subsequent cutting step. In yet another embodiment, during the subsequent grinding step the rolling contact surface is ground to a finished state, i.e. the rolling contact surface (e.g. raceway of a bearing ring) needs no further treatments and is thus ready to be used.

In an embodiment, the second material is a metallic powder material.

In an embodiment of the process, the diffusion welding is made by hot isostatic pressing (HIP). In another embodiment, the hot isostatic pressing is made at a temperature of between 1000 and 1300° C. In another embodiment, the hot isostatic pressing is conducted at a temperature of between 1050-1250 degrees Celsius. In another embodiment, the hot isostatic pressing is conducted at a temperature of 1100-1200 degrees Celsius. In another embodiment, the hot isostatic pressing is conducted at a temperature of 1150 degrees Celsius. In another embodiment, the hot isostatic pressing is performed during 1 to 6 hours. In a further embodiment, the hot isostatic pressing is performed during 2 to 4 hours. In another embodiment, the hot isostatic pressing is performed under a pressure of 80-310 MPa.

In an embodiment of the process, the bearing component is subsequently cut into at least two pieces creating at least two bearing components. It may be even more efficient to manufacture bearing components by using one bearing component part having at least two grooves and then perform the above process steps to bond the powder material to the bearing component part and subsequently divide the bearing component into several bearing components. This may be done by e.g. cutting an elongated ring into several rings (i.e. dividing the bearing component into several bearing components). For instance, inner rings could be efficiently produced by providing a bearing component part presenting several grooves on the outer periphery of the bearing component part (located at least partly at the rolling contact surfaces of the inner ring) and subsequently fixating a sheet metal strip onto the bearing component part by welding it onto the part and followed by a diffusion welding step as described above. After this, the bearing component part may be divided into several rings. The bearing component part (bearing body) may be a cast body made of cast iron or cast steel, which is a cheap material compared to high performance bearing steels.

In an embodiment, a hardening operation may be conducted simultaneously or directly following the diffusion welding step. The second material and the bearing component part are preferably heated to a temperature of between 1000 and 1300 degrees Celsius during the diffusion welding. Subsequently, from the diffusion welding temperature the bearing component may be subjected to a hardening step to thereby obtain a preferred hardness and phase of the second material and the bearing component part. For instance, a bainitic and/or a martensitic structure may be obtained. In an embodiment, the hardening step is followed by tempering.

BRIEF DESCRIPTION OF DRAWINGS

Exemplifying embodiments of the present invention will now be described in more detail, with reference to the accompanying drawings, wherein:

FIG. 3 illustrates an embodiment of the process according to the invention;

Figure 1:
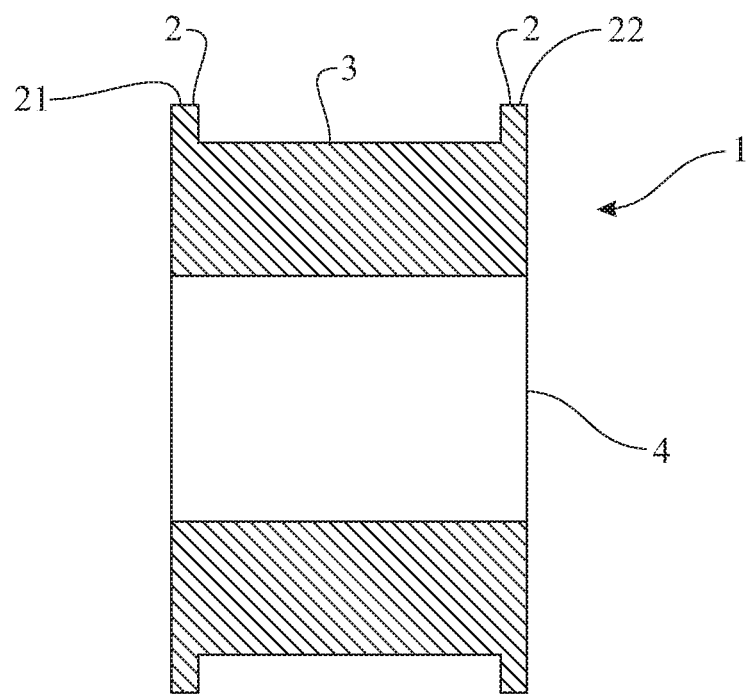
FIG. 1 shows a bearing component part according to the invention.

The drawings show diagrammatic exemplifying embodiments of the present invention and are thus not drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF DRAWINGS

FIG. 1 shows a cross section of a bearing component part 1 according to the invention. The bearing component part 1 comprises a circumferential peripheral surface 2 which presents a groove 3, which in this embodiment extends around the whole circumference of the peripheral surface 2. The groove 3 is arranged to receive a metallic powder material (not shown in this figure). The groove 3 may for instance be ground. In an embodiment, the surface of the groove 3 presents a fine ground surface which is adapted to receive second material and further such that a good and reliable bond can be achieved. The groove surface 3 may be cleaned and activated in other ways than by fine grinding. It may be well degreased, machined, sandblasted or chemical activated to achieve a suitable surface cleanliness, surface finish and surface texture. In this specific embodiment, the bearing component part 1 is a part of an inner ring of a bearing, and therefore further presents a bore 4. The peripheral surface 2 further presents a first portion 21 and a second portion 22. The first and second portions 21 and 22 are located on opposite sides of the groove 3 along the circumference of the peripheral surface 2. The first and second portions 21 and 22 further comprise weldable metallic material. Preferably, the bearing component part 1 is made of a homogenous weldable metallic material, such as weldable cast steel or weldable cast iron. However, the bearing component part 1 may also be made of different materials, where the first and second portions 21 and 22 are made of weldable metallic material.

Figure 2:
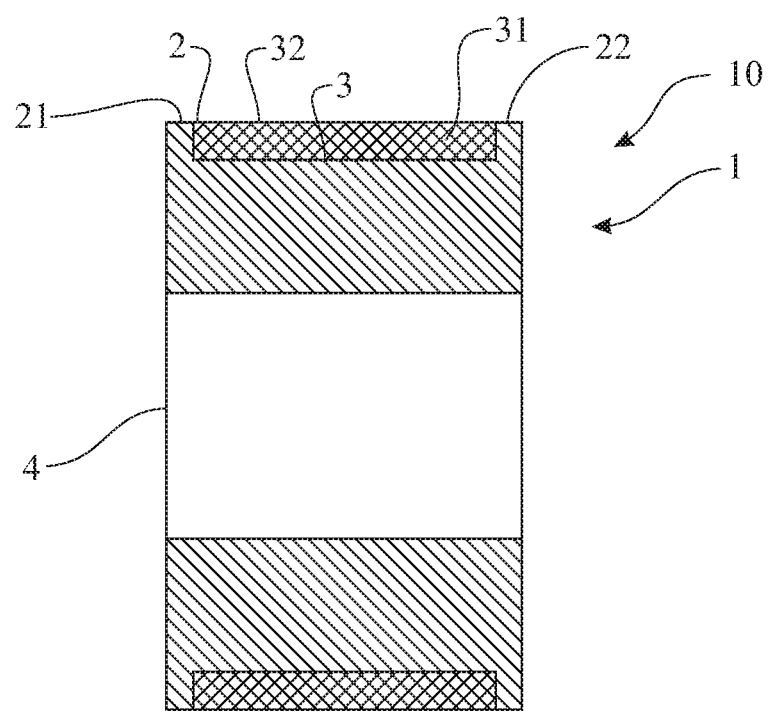
FIG. 2 illustrates a bearing component according to the invention.

FIG. 2 shows a cross section of a bearing component 10 according to the invention. The bearing component 10 comprises a bearing component part 1 as shown in FIG. 1, which comprises a circumferential peripheral surface 2, a groove 3, a first and second portion 21 and 22, and a bore 4. In addition, the bearing component 10 comprises a second material 31 which has been filled into the groove 3 and then been subjected to diffusion welding such that the second material 31 has bonded to the bearing component part 1. The second material 31 is in this embodiment a metallic powder material which has been bonded to the bearing component part 1 by diffusion welding. In this embodiment, the bearing component 10 is an inner ring of a bearing (not shown) and the second material 31 is located at least at the raceway 32 of the inner ring. The raceway 32 is intended to receive a number of rolling elements (such as balls or rollers). The shape of the raceway 32 is in this embodiment cylindrical, but the shape may be of any other kind. If the bearing component 10 for instance was a bearing component for a spherical double row roller bearing, two raceways would be present and a second material could be located in two grooves at least at the raceways of the bearing. The raceways in a spherical roller bearing have a curved spherical profile and consequently the second material and the grooves should correspond to such a raceway profile. Thereby, the ring may be made into near net shape, without a need for any major subsequent process steps, such as the need for ring rolling. Thus, one advantage of the present invention is that the process, and especially the step of fixating of a sheet metal strip to the bearing component part leads to that it is possible to efficiently produce a bearing component into a near net shape without the need of any major subsequent process steps, such as ring rolling. However, subsequent steps such as heat treatment, grinding and honing may still be performed. Further, the bearing component could also be an outer ring of a bearing of any kind (not shown). Consequently, the groove 3 and the second material 31 should be located on the inner circumferential peripheral surface of the bearing component part at least at the raceway of the outer ring. Further, the location of the portions 21 and 22 is essential since it allows a sheet metal strip (not shown) to be welded to the bearing component part 1 and to create a closed space for the groove 3. The sheet metal strip is needed for the diffusion welding process, preferably made by Hot Isostatic Pressing (HIP), and leads to a simplified and efficient process for obtaining the bearing component 10.

Figure 4:
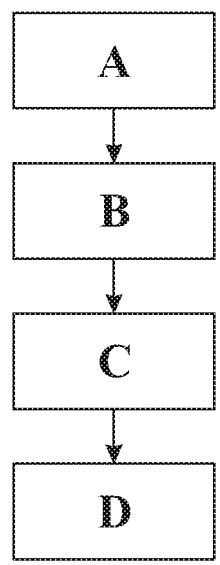
FIG. 4 shows a block diagram of an embodiment of the invention.

FIG. 3 and FIG. 4 represent embodiments of the process according to the invention. Referring now to FIG. 3, in step A, a cross section of a bearing component part 1 is shown. The bearing component part 1 is in this embodiment a bearing component part 1 as shown in FIG. 1, comprising a circumferential peripheral surface 2, a groove 3, a first and second portion 21 and 22, and a bore 4. In step B a sheet metal strip 5 is welded onto the bearing component part 1. The strip 5 is welded onto the bearing component part 1 via the first and second portions 21 and 22 which are located on opposite sides of the groove 3. The sheet metal strip 5 may be an elongated strip which is bent into a ring shape corresponding to the ring shape of the bearing component part 1. In an embodiment, the sheet metal strip 5 may also before it is welded onto the bearing component part 1 be in the form of a ring and subsequently be welded onto the bearing component part 1. The sheet metal strip 1 covers the groove 3 and thereby creates a hermetically closed space. This is an efficient method to create the closed space which is necessary for the diffusion welding step. Subsequently, before or simultaneously as the strip 5 is welded onto the bearing component part 1, the closed space is filled with a second material 31, which in this embodiment is a metallic powder material. If the metallic powder material 31 is filled into the closed space after the sheet metal strip 5 is attached to the bearing component part 1 it may be filled via at least one bore (not shown) in the bearing component part 1 and/or in the sheet metal strip 5. This bore should preferably be sealed and closed after the filling to not disturb the subsequent diffusion welding step. When the material 31 has been filled into the closed space it is diffusion welded and thereby tightly bonded to the bearing component part. The diffusion welding can for instance be made by hot isostatic pressing (HIP), which is an efficient method to bond the material 31 to the bearing component part 1. Further in this embodiment of the process, a subsequent step D is performed by removing the sheet metal strip 5 from the bearing component 10. The removal can be made by e.g. cutting or grinding and further the removal may include a final grinding step for the surface 32, which a raceway surface of the inner ring 10. FIG. 4 shows a flow diagram of the process as described for FIG. 3, including step A, B, C and D.

Figure 5:
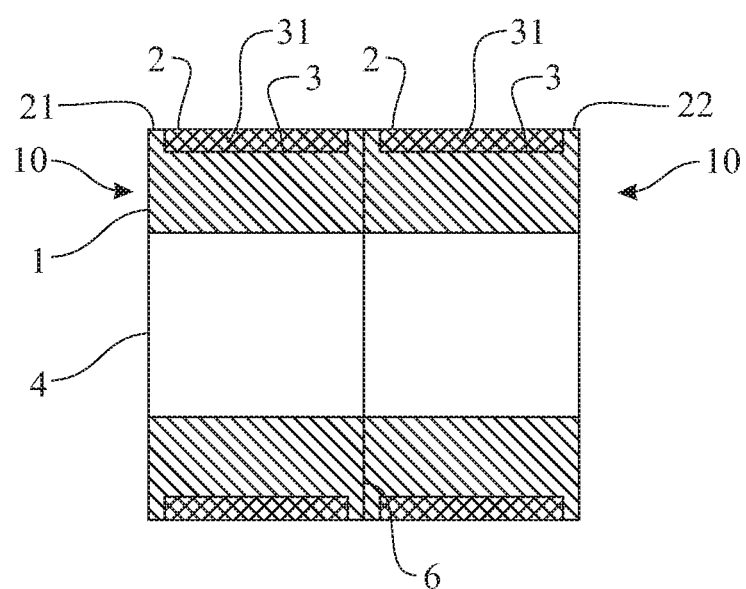
FIG. 5 shows an embodiment of two bearing components according to the invention.

FIG. 5 is an illustration to show how several bearing components 10 according to the invention can be made in an efficient manner. A bearing component part 1 is shown comprising two grooves 3 located on the outer peripheral surface of the bearing component part 1. In addition, a bore 4 is present extending through the bearing component part 1. In the grooves 3, a second material 31 is present. The second material 31 has been subjected to a diffusion welding process, wherein a sheet metal strip (not shown) created a closed space for the second material 31 during the process. The sheet metal strip was fixed to the bearing component part 1 via the first and second portions 21 and 22 which are located on the circumferential peripheral surface 2. Further portions may be present on the bearing component part 1, for instance there may be welding portions between the two grooves 3 and 3 on the circumferential peripheral surface 2. After the diffusion welding step, the bearing component part may be divided into two bearing components 10 and 10, as seen in the figure by the line 6. This is an efficient method to manufacture several bearing components.

The invention claimed is:

1. A process for manufacturing a bearing component, such as a bearing ring or a roller, comprising:
    (A) providing a bearing component part comprising:
        at least one circumferential peripheral surface, wherein the circumferential peripheral surface presents at least one groove extending along at least a part of the circumference of the peripheral surface, wherein the groove is arranged to receive a second material; and
        the peripheral surface further presenting a first portion and a second portion located on opposite sides of the at least one groove along the circumference of the peripheral surface,
        wherein the bearing component part comprises a weldable metallic material,
    (B) fixating a sheet metal strip to the bearing component part, so that the at least one groove and the sheet metal strip creates at least one closed space,
    (C) filling the at least one closed space with the second material, and diffusion welding the second material to thereby fixate and bond the second material to the bearing component part.

2. The process according to claim 1, wherein the sheet metal strip is fixated to the bearing component part by welding.

3. The process according to claim 1, when the first portion and the second portion of the bearing component part comprise the weldable metallic material, the sheet metal strip is fixated to the circumferential peripheral surface via the weldable first portion and the second portion by welding.

4. The process according to claim 1, wherein the sheet metal strip is subsequently removed from the bearing component.

5. The process according to claim 4, wherein the removal of the sheet metal strip is made by one of: a subsequent grinding step, or a subsequent cutting step.

6. The process according to claim 1, wherein the diffusion welding is made by hot isostatic pressing.

7. The process according to claim 6, wherein the hot isostatic pressing is made at a temperature of between 1000 and 1300° C.

8. The process according to claim 6, wherein the hot isostatic pressing is performed during 1 to 6 hours.

9. The process according to claim 6, wherein the hot isostatic pressing is performed under a pressure of 80-310 MPa.

10. The process according to claim 1, wherein the bearing component is subsequently cut into at least two pieces creating at least two bearing components.

11. The process according to claim 1, wherein the second material is a metallic powder material.

* * * * *